(12) United States Patent
Ichikawa et al.

(10) Patent No.: US 10,955,849 B2
(45) Date of Patent: Mar. 23, 2021

(54) AUTOMATIC DRIVING SYSTEM

(71) Applicant: TOYOTA JIDOSHA KABUSHIKI KAISHA, Toyota (JP)

(72) Inventors: Kentaro Ichikawa, Shizuoka-ken (JP); Kunihito Sato, Mishima (JP); Bunyo Okumura, Susono (JP); Maiko Hirano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 15/926,271

(22) Filed: Mar. 20, 2018

(65) Prior Publication Data

US 2018/0284790 A1 Oct. 4, 2018

(30) Foreign Application Priority Data

Mar. 28, 2017 (JP) .............................. JP2017-063615

(51) Int. Cl.
| | |
|---|---|
| *G05D 1/02* | (2020.01) |
| *G05D 1/00* | (2006.01) |
| *B60W 30/18* | (2012.01) |
| *B60W 50/10* | (2012.01) |
| *B60W 50/08* | (2020.01) |
| *B60W 30/14* | (2006.01) |

(52) U.S. Cl.
CPC ........... *G05D 1/0214* (2013.01); *B60W 30/14* (2013.01); *B60W 30/18163* (2013.01);
(Continued)

(58) Field of Classification Search
CPC .......... G05D 1/0214; B60W 2050/007; B60W 2050/0062; B60W 2050/0075;
(Continued)

(56) References Cited

U.S. PATENT DOCUMENTS

| | | |
|---|---|---|
| 8,260,482 B1 | 9/2012 | Szybalski et al. |
| 8,670,891 B1 | 3/2014 | Szybalski et al. |

(Continued)

FOREIGN PATENT DOCUMENTS

| | | |
|---|---|---|
| DE | 10 2012 002 581 A1 | 8/2013 |
| DE | 10 2012 005 779 A1 | 9/2013 |

(Continued)

*Primary Examiner* — Jeff A Burke
*Assistant Examiner* — Jamal A Shah
(74) *Attorney, Agent, or Firm* — Sughrue Mion, PLLC

(57) ABSTRACT

An automatic driving system includes at least one electronic control unit configured to: generate a traveling plan so as to moderate a change in behavior of a vehicle at a time when an automatic driving control of the vehicle is started by an automatic engagement compared to a change in the behavior of the vehicle at a time when the automatic driving control is started by a triggered engagement, the automatic engagement being an engagement in which the automatic driving control is automatically started when an automatic engagement condition is satisfied, the triggered engagement being an engagement in which the automatic driving control is started when an automatic driving start condition is satisfied and an automatic driving start trigger is input by an occupant; and execute the automatic driving control by controlling the behavior of the vehicle based on the traveling plan, using an actuator equipped in the vehicle.

6 Claims, 8 Drawing Sheets

(52) U.S. Cl.
CPC .......... *B60W 50/082* (2013.01); *B60W 50/10* (2013.01); *G05D 1/0088* (2013.01); *G05D 1/0223* (2013.01); *B60K 2370/175* (2019.05); *B60W 2540/215* (2020.02); *B60W 2556/50* (2020.02); *B60W 2720/103* (2013.01); *G05D 2201/0212* (2013.01)

(58) Field of Classification Search
CPC . B60W 2050/0071; B60W 2050/0074; B60W 2050/0095; B60W 2050/0096; B60W 30/00; B60W 60/005; B60W 60/0051
See application file for complete search history.

(56) References Cited

U.S. PATENT DOCUMENTS

| | | | |
|---|---|---|---|
| 9,008,890 B1* | 4/2015 | Herbach | G05D 1/0297 |
| | | | 701/26 |
| 9,452,755 B2* | 9/2016 | Kastner | G05D 13/02 |
| 9,581,460 B1* | 2/2017 | McNew | G01C 21/3667 |
| 2011/0196555 A1* | 8/2011 | Hennings | B60K 6/52 |
| | | | 701/22 |
| 2015/0210272 A1 | 7/2015 | Edgren | |
| 2016/0009291 A1* | 1/2016 | Pallett | B60W 50/085 |
| | | | 701/23 |
| 2016/0318518 A1 | 11/2016 | Suzuki et al. | |
| 2017/0261981 A1 | 9/2017 | Ichikawa et al. | |
| 2017/0315550 A1 | 11/2017 | Ichikawa et al. | |

FOREIGN PATENT DOCUMENTS

| | | |
|---|---|---|
| DE | 10 2013 016 488 A1 | 4/2015 |
| DE | 10 2013 017 209 A1 | 4/2015 |
| JP | 2016203942 A | 12/2016 |
| JP | 2017019466 A | 1/2017 |
| JP | 2017-159754 A | 9/2017 |
| JP | 2017-197053 A | 11/2017 |

* cited by examiner

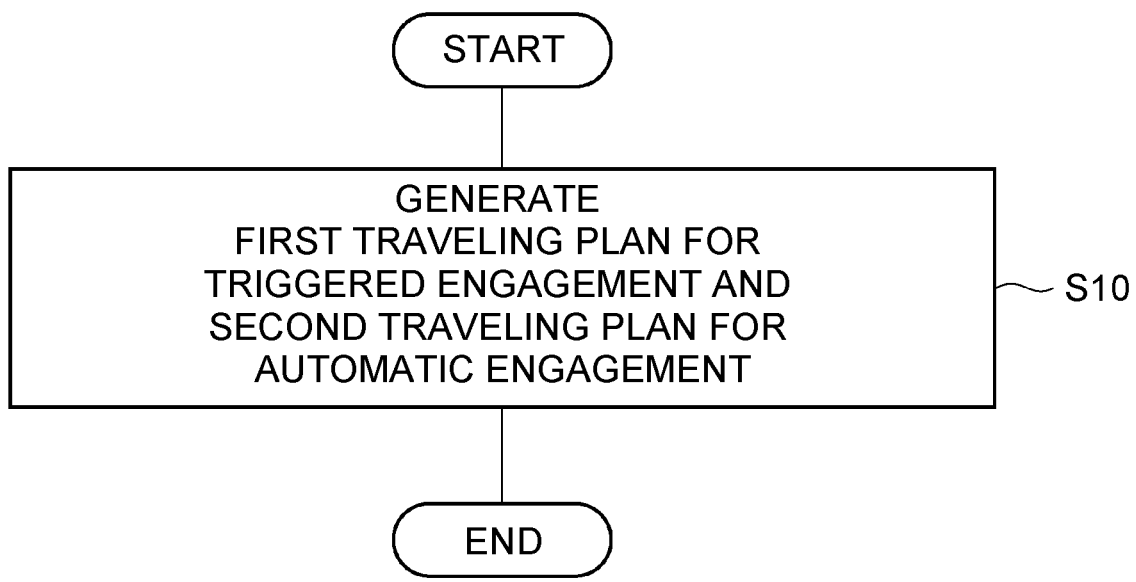

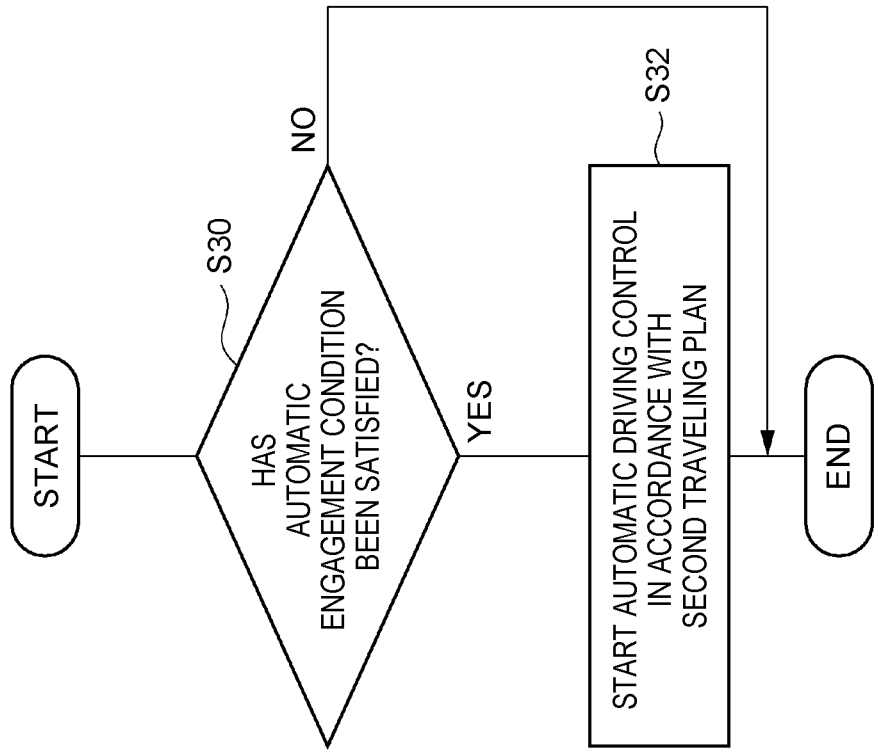
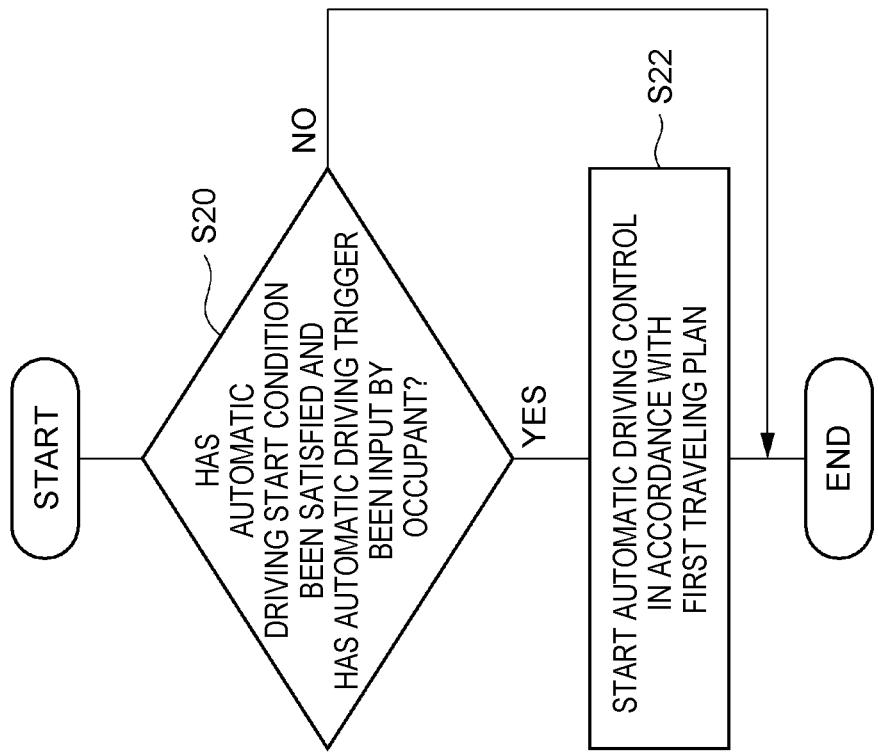

AUTOMATIC DRIVING SYSTEM

INCORPORATION BY REFERENCE

The disclosure of Japanese Patent Application No. 2017-063615 filed on Mar. 28, 2017 including the specification, drawings and abstract is incorporated herein by reference in its entirety.

BACKGROUND

1. Technical Field

The disclosure relates to an automatic driving system.

2. Description of Related Art

As a technical literature about an automatic driving system, U.S. Pat. No. 8,670,891 described below is known. U.S. Pat. No. 8,670,891 discloses an automatic driving control method in which a notice of preparation completion is given to a user (occupant) when a control computer determines that an automatic driving control of a vehicle is ready and in which the control computer, after the notice, starts (engages) the automatic driving control when receiving a first input indicating that the user is ready.

SUMMARY

The start of the automatic driving control by the input (trigger) from the occupant of the vehicle as in the case of the above-described technology is called a triggered engagement. In the triggered engagement, the automatic driving control is started at a timing intended by the occupant. Therefore, even when the behavior of the vehicle is changed by the automatic driving control for achieving an optimal state, the occupant is likely to accept the change in many cases.

Meanwhile, there has been an automatic engagement in which the automatic driving control is automatically started when a predetermined condition is satisfied. However, unlike the triggered engagement, in the automatic engagement, the automatic driving control is not always started at a timing intended by the occupant. Therefore, when the behavior is sharply changed at the time when the automatic driving control is started by the automatic engagement, an uneasy sense is sometimes given to the occupant. Further, when the driver hopes to continue manual driving, there is a possibility that the behavior of the vehicle can be greatly changed until the automatic driving control is cancelled by the occupant.

The disclosure provides an automatic driving system that can restrain an uneasy sense from being given to the occupant.

A first aspect of the disclosure provides an automatic driving system. The automatic driving system according to the first aspect includes: at least one electronic control unit configured to: generate a traveling plan so as to moderate a change in behavior of a vehicle at a time when an automatic driving control of the vehicle is started by an automatic engagement compared to a change in the behavior of the vehicle at a time when the automatic driving control is started by a triggered engagement, the automatic engagement being an engagement in which the automatic driving control is automatically started when an automatic engagement condition is satisfied, the triggered engagement being an engagement in which the automatic driving control is started when an automatic driving start condition is satisfied and an automatic driving start trigger is input by an occupant; and execute the automatic driving control by controlling the behavior of the vehicle based on the traveling plan, using an actuator equipped in the vehicle.

According to the configuration, the traveling plan is generated so as to moderate the change in the behavior of the vehicle at the time when the automatic driving control is started by the automatic engagement compared to the change in the behavior of the vehicle at the time when the automatic driving control is started by the triggered engagement. Therefore, it is possible to restrain an uneasy sense from being given to the occupant at the time when the automatic driving control is started by the automatic engagement, compared to when the change in the behavior of the vehicle at the time of the start of the automatic driving control is the same between the triggered engagement and the automatic engagement.

In the automatic driving system according to the first aspect, the at least one electric control unit may be configured to generate the traveling plan so as to moderate the change in the behavior of the vehicle when the automatic driving control is started by the automatic engagement compared to the change in the behavior of the vehicle when the automatic driving control is started by the triggered engagement, by at least one of decreasing a change in a vehicle speed at which the vehicle travels until the vehicle reaches a predetermined position from a current position of the vehicle, increasing a distance by which the vehicle travels until the vehicle reaches the predetermined position from the current position of the vehicle, increasing a time that elapses until the vehicle reaches the predetermined position from the current position of the vehicle, and decreasing a maximum curvature of a route along which the vehicle travels until the vehicle reaches the predetermined position from the current position of the vehicle.

In the automatic driving system according to the first aspect, the at least one electronic control unit may be configured to generate a first traveling plan as the traveling plan, the first traveling plan being used in the automatic driving control by the triggered engagement, generate a second traveling plan, as the traveling plan, the second traveling plan being used in the automatic driving control by the automatic engagement, control the behavior of the vehicle based on the first traveling plan, in the automatic driving control by the triggered engagement, and control the behavior of the vehicle based on the second traveling plan, in the automatic driving control by the automatic engagement.

According to the configuration, the first traveling plan for the triggered engagement and the second traveling plan for the automatic engagement are generated. Therefore, even when the occupant suddenly inputs the automatic driving start trigger during the preparation of the automatic engagement, it is possible to start the automatic driving control by the triggered engagement, based on the first traveling plan.

In the automatic driving system according to the first aspect, the at least one electronic control unit may be configured to generate the traveling plan by a first generation method corresponding to the triggered engagement, when the automatic driving start condition is satisfied and the automatic driving start trigger is input by the occupant, and generate the traveling plan by a second generation method corresponding to the automatic engagement, when the automatic engagement condition is satisfied.

According to the configuration, the traveling plan is generated when the automatic driving control is started by the triggered engagement or the automatic engagement. Therefore, it is possible to decrease computation load in the whole system, compared to when both the traveling plan for the triggered engagement and the traveling plan for the automatic engagement are generated.

In the automatic driving system according to the first aspect, the at least one electronic control unit may be configured to control the vehicle so as to moderate the change in the behavior of the vehicle at the time when the automatic driving control is started by the automatic engagement compared to the change in the behavior of the vehicle at the time when the automatic driving control is started by the triggered engagement.

According to the configuration, the vehicle is controlled so as to moderate the change in the behavior of the vehicle at the time when the automatic driving control is started by the automatic engagement compared to the change in the behavior of the vehicle at the time when the automatic driving control is started by the triggered engagement. Therefore, it is possible to restrain an uneasy sense from being given to the occupant at the time when the automatic driving control is started by the automatic engagement, compared to when the change in the behavior of the vehicle at the time of the start of the automatic driving control is the same between the triggered engagement and the automatic engagement.

A second aspect of the disclosure provides an automatic driving system. The automatic driving system according to the second aspect includes: at least one electronic control unit configured to: generate a traveling plan in an automatic driving control of a vehicle; execute the automatic driving control by controlling behavior of the vehicle based on the traveling plan, using an actuator equipped in the vehicle; and moderate a change in the behavior of the vehicle at a time when the automatic driving control is started by an automatic engagement compared to a change in the behavior of the vehicle at a time when the automatic driving control is started by a triggered engagement, the automatic engagement being an engagement in which the automatic driving control is automatically started when an automatic engagement condition is satisfied, the triggered engagement being an engagement in which the automatic driving control is started when an automatic driving start condition is satisfied and an automatic driving start trigger is input by an occupant.

According to the configuration, the vehicle is controlled so as to moderate the change in the behavior of the vehicle at the time when the automatic driving control is started by the automatic engagement compared to the change in the behavior of the vehicle at the time when the automatic driving control is started by the triggered engagement. Therefore, it is possible to restrain an uneasy sense from being given to the occupant at the time when the automatic driving control is started by the automatic engagement, compared to when the change in the behavior at the time of the start of the automatic driving control is the same between the triggered engagement and the automatic engagement.

In the automatic driving system according to the second aspect, the at least one electronic control unit may be configured to moderate the change in the behavior of the vehicle at the time when the automatic driving control is started by the automatic engagement compared to the change in the behavior of the vehicle at the time when the automatic driving control is started by the triggered engagement, by decreasing a followability to the traveling plan for the vehicle.

As described above, the automatic driving system according to the first aspect or second aspect of the disclosure can restrain an uneasy sense from being given to the occupant.

BRIEF DESCRIPTION OF THE DRAWINGS

Features, advantages, and technical and industrial significance of exemplary embodiments will be described below with reference to the accompanying drawing s, in which like numerals denote like elements, and wherein:

FIG. 4 is a flowchart showing a traveling plan generation process;

FIG. 5A is a flowchart showing a start process for an automatic driving control by the triggered engagement;

FIG. 5B is a flowchart showing a start process for the automatic driving control by the automatic engagement;

DETAILED DESCRIPTION OF EMBODIMENTS

Hereinafter, embodiments will be described with reference to the drawings.

First Embodiment

Figure 1:
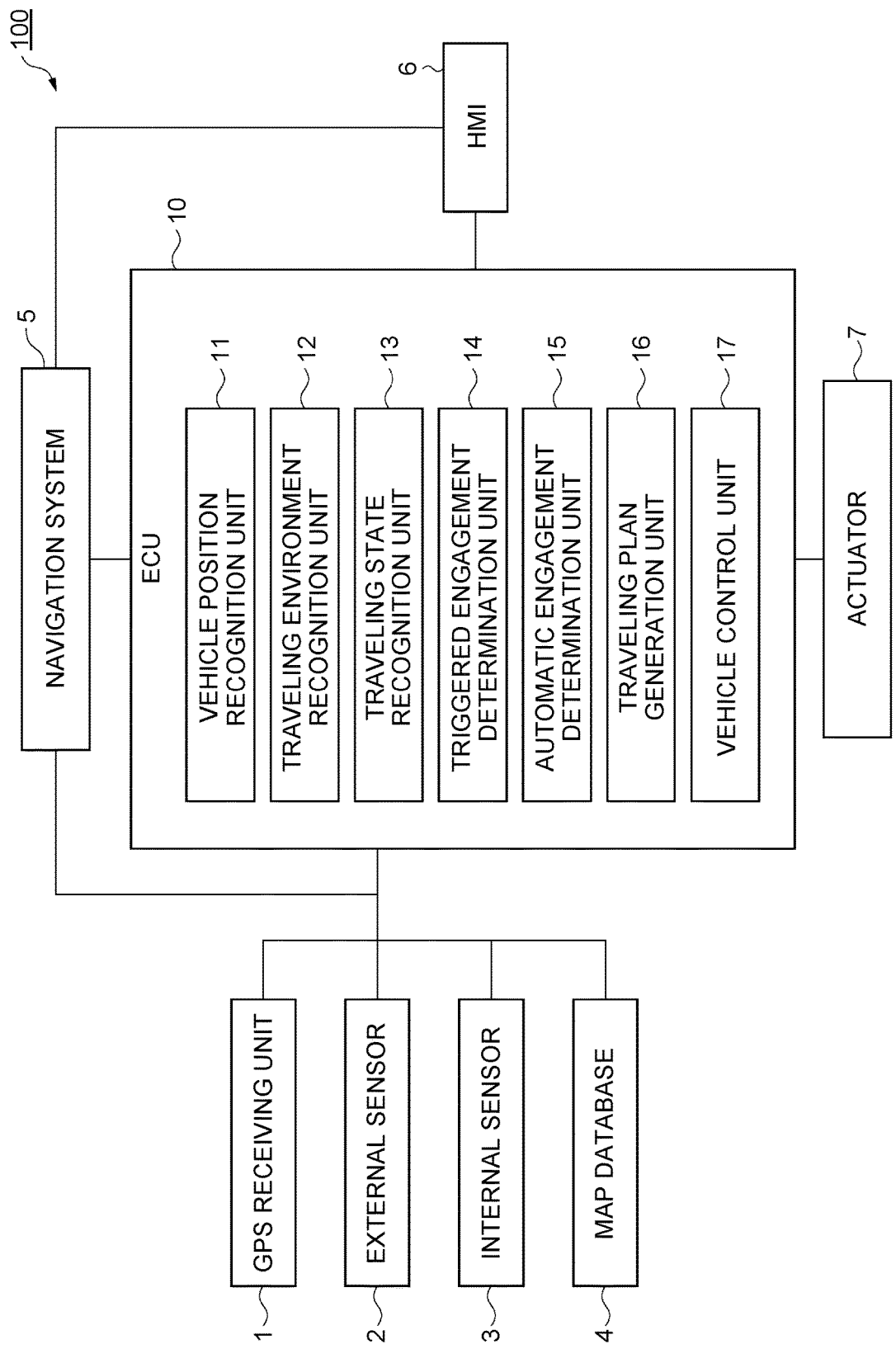
FIG. 1 is a block diagram showing an automatic driving system according to a first embodiment.

FIG. 1 is a block diagram showing an automatic driving system according to a first embodiment. An automatic driving system 100 shown in FIG. 1, which is equipped in a vehicle such as a passenger car, executes an automatic driving control of the vehicle. The automatic driving control is a vehicle control of making the vehicle automatically travel to a preset destination. In the automatic driving control, an occupant does not need to perform driving operations, and the vehicle automatically travels.

The automatic driving system 100 can execute a triggered engagement and an automatic engagement. In the triggered engagement, the automatic driving control of the vehicle is started when an automatic driving start condition is satisfied and an automatic driving start trigger is input by the occupant. In the automatic engagement, the automatic driving control of the vehicle is automatically started when an automatic engagement condition is satisfied. Details of the triggered engagement and the automatic engagement will be described later.

Configuration of Automatic Driving System According to First Embodiment

As shown in FIG. 1, the automatic driving system 100 includes an electronic control unit (ECU) 10 that integrally manages the system. The ECU 10 is an electronic control unit including a central processing unit (CPU), a read only memory (ROM), a random access memory (RAM), a controller area network (CAN) communication circuit, and the like. For example, the ECU 10 loads programs stored in the ROM, into the RAM, and the CPU executes the programs loaded in the RAM, so that various functions are realized. The ECU 10 may be constituted by a plurality of electronic units.

The ECU 10 is connected with a GPS receiving unit 1, an external sensor 2, an internal sensor 3, a map database 4, a navigation system 5, a human machine interface (HMI) 6, and an actuator 7.

The GPS receiving unit 1 measures the position of the vehicle (for example, the latitude and longitude of the vehicle) by receiving signals from three or more GPS satellites. The GPS receiving unit 1 sends the measured positional information of the vehicle, to the ECU 10.

The external sensor 2 is a detection device that detects a condition around the vehicle. The external sensor 2 includes at least one of a camera and a radar sensor.

The camera is an imaging device that images an external condition of the vehicle. The camera is provided on the back side of a front windshield of the vehicle. The camera sends the imaging information about the external condition of the vehicle, to the ECU 10. The camera may be a monocular camera or a stereo camera. The stereo camera includes two imaging units that are disposed so as to reproduce a binocular parallax. The imaging information of the stereo camera includes information about a deep direction.

The radar sensor is a detection device that detects an obstacle around the vehicle using an electric wave (for example, a millimeter wave) or light. For example, the radar sensor includes a millimeter wave radar or a light detection and ranging (LIDAR). The radar sensor detects the obstacle by sending the electric wave or light around the vehicle and receiving the electric wave or light reflected by the obstacle. The radar sensor sends the detected obstacle information to the ECU 10. The obstacle includes moving obstacles such as a pedestrian, a bicycle and another vehicle, in addition to fixed obstacles such as a guardrail and a building.

The internal sensor 3 is a detection device that detects a traveling state of the vehicle. The internal sensor 3 includes a speed sensor, an acceleration sensor, and a yaw rate sensor. The speed sensor is a detector that detects the speed of the vehicle. As the speed sensor, for example, there is used a wheel speed sensor that is provided on a wheel of the vehicle, a drive shaft to rotate integrally with the wheel, or the like, and that detects the rotational speed of the wheel. The speed sensor sends the detected vehicle speed information (wheel speed information) to the ECU 10.

The acceleration sensor is a detector that detects the acceleration of the vehicle. For example, the acceleration sensor includes a front-back acceleration sensor that detects the acceleration of the vehicle in the front-back direction of the vehicle, and a lateral acceleration sensor that detects the lateral acceleration of the vehicle. For example, the acceleration sensor sends the acceleration information of the vehicle to the ECU 10. The yaw rate sensor is a detector that detects the yaw rate (turning angle velocity) of the center of gravity of the vehicle around the vertical axis of the vehicle. As the yaw rate sensor, for example, a gyro sensor can be used. The yaw rate sensor sends the detected yaw rate information of the vehicle to the ECU 10.

The map database 4 is a database that stores map information. For example, the map database 4 is formed in a hard disk drive (HDD) equipped in the vehicle. The map information includes information about positions of roads, information about forms of roads (for example, types of curves and straight sections, and curvatures of curvatures), information about positions of intersections and forks, information about positions of structures, and the like. The map database 4 may be formed in a computer within a facility such as a management center that can communicate with the vehicle.

The navigation system 5 is a system that guides the occupant of the vehicle to a preset destination. The navigation system 5 generates a route from the current position of the vehicle to the destination, based on the position of the vehicle measured by the GPS receiving unit 1 and the map information of the map database 4. The navigation system 5 performs the guidance of the route to the occupant, through an image display and a voice output by the HMI 6 described later. The navigation system 5 sends the information about the destination of the vehicle and the route of the vehicle, to the ECU 10. Here, the automatic driving system 100 does not always need to include the navigation system 5. The generation of the route of the vehicle may be performed by the ECU 10. The destination may be set by the occupant, or may be automatically set by the navigation system 5 or the like, based on a well-known technique.

The HMI 6 is an interface for inputting and outputting information between the automatic driving system 100 and the occupant. For example, the HMI 6 includes a display, a speaker, and the like. The HMI 6 performs an image output on the display and a voice output from the speaker, in response to a control signal from the ECU 10. The display may be a head-up display. For example, the HMI 6 includes input devices (a button, a touch panel, a voice inputter and the like) for accepting an input from the occupant.

The actuator 7 is a device that is used for the control of the vehicle. The actuator 7 includes at least a throttle actuator, a brake actuator, and a steering actuator. The throttle actuator controls the supply amount of air to an engine (throttle opening degree) and controls driving power of the vehicle, in response to a control signal from the ECU 10. In the case where the vehicle is a hybrid vehicle, in addition to the supply amount of air to the engine, a control signal from the ECU 10 is input to a motor as a dynamic power source, so that the driving power is controlled. In the case where the vehicle is an electric vehicle, a control signal from the ECU 10 is input to a motor as a dynamic power source (a motor that functions as an engine), so that the driving power is controlled. In these cases, the motors as dynamic power sources constitute the actuator 7.

The brake actuator controls a brake system and controls braking power that is given to wheels of the vehicle, in response to a control signal from the ECU 10. As the brake system, for example, a hydraulic brake system can be used. The steering actuator controls the drive of an assist motor of an electric power steering system that controls steering torque, in response to a control signal from the ECU 10. Thereby, the steering actuator controls the steering torque of the vehicle.

Next, a functional configuration of the ECU 10 will be described. The ECU 10 includes a vehicle position recognition unit 11, a traveling environment recognition unit 12, a traveling state recognition unit 13, a triggered engagement determination unit 14, an automatic engagement determination unit 15, a traveling plan generation unit 16, and a vehicle control unit 17. Some of the following functions of the ECU 10 may be executed in a server within a facility such as a management center that can communicate with the vehicle.

The vehicle position recognition unit 11 recognizes the position of the vehicle on a map, based on the positional information of the GPS receiving unit 1 and the map information of the map database 4. The vehicle position recognition unit 11 recognizes the position of the vehicle, by a simultaneous localization and mapping (SLAM) technology, using the positional information about fixed obstacles such as utility poles that is included in the map information of the map database 4, and the detection result of the external sensor 2. The vehicle position recognition unit 11 may recognize the position of the vehicle on the map, by another well-known technique. The vehicle position recognition unit 11 may calculate the positional error of the vehicle, by a well-known technique.

The traveling environment recognition unit 12 recognizes the traveling environment of the vehicle, based on the detection result of the external sensor 2. The traveling environment includes the position of the obstacle relative to the vehicle, the speed of the obstacle relative to the vehicle, the moving direction of the obstacle relative to the vehicle, and the like. The traveling environment recognition unit 12 recognizes the traveling environment of the vehicle, by a well-known technique, based on the image taken by the camera and the obstacle information of the radar sensor.

The traveling state recognition unit 13 recognizes the state of the traveling vehicle, based on the detection result of the internal sensor 3. The traveling state includes the vehicle speed of the vehicle, the acceleration of the vehicle and the yaw rate of the vehicle. Specifically, the traveling state recognition unit 13 recognizes the vehicle speed of the vehicle, based on the vehicle speed information of the speed sensor. The traveling state recognition unit 13 recognizes the acceleration (front-back acceleration and lateral acceleration) of the vehicle, based on the acceleration information of the acceleration sensor. The traveling state recognition unit 13 recognizes the yaw rate of the vehicle, based on the yaw rate information of the yaw rate sensor.

The triggered engagement determination unit 14 determines whether an automatic driving start condition has been satisfied. The automatic driving start condition is a precondition for starting the automatic driving control by the triggered engagement. For example, as one automatic driving start condition, it is allowable to adopt a condition that the vehicle is positioned in a preset section on the map where the automatic driving can be performed. The section where the automatic driving can be performed is set, for example, based on the accuracy, freshness and others of the map information stored in the map database 4. As one automatic driving start condition, it is allowable to adopt a condition that the positional error of the vehicle by the vehicle position recognition unit 11 is equal to or less than an error threshold. The error threshold is a preset threshold. The positional error of the vehicle can be evaluated by a well-known technique.

As one automatic driving start condition, it is allowable to adopt a condition that the reliability of the automatic driving system 100, which is computed by a well-known technique, is equal to or more than a reliability threshold. The reliability threshold is a preset threshold. The reliability of the automatic driving system 100 may be evaluated from the reliability of the external sensor 2, the reliability of the internal sensor 3, and the like. For example, the reliability of the external sensor 2 can be evaluated based on the consistency between the obstacle recognized from the image taken by the camera of the external sensor 2 and the obstacle information of the radar sensor.

As one automatic driving start condition, it is allowable to adopt a condition that the vehicle has an attitude of straight advance and the vehicle speed is equal to or lower than a certain threshold. As one automatic driving start condition, it is allowable to adopt a condition that a shift lever of the vehicle is at a shift position of "D (Drive)". As one automatic driving start condition, it is allowable to adopt a condition that the difference between a target speed in a traveling plan and the current speed is equal to or less than a set value. As one automatic driving start condition, it is allowable to adopt a condition that the difference between a traveling curvature calculated from a target steering angle in the traveling plan and a curvature of a road on which the vehicle is currently traveling is equal to or less than a set value. As one automatic driving start condition, it is allowable to adopt a condition that the current vehicle speed is equal to or lower than a set value regardless of the attitude of the vehicle. Each of the set values is an appropriately set threshold.

The triggered engagement determination unit 14 determines whether the automatic driving start condition has been satisfied, based on the map information of the map database 4, the position of the vehicle on the map recognized by the vehicle position recognition unit 11, the traveling environment of the vehicle recognized by the traveling environment recognition unit 12, and the traveling state of the vehicle recognized by the traveling state recognition unit 13.

When the triggered engagement determination unit 14 determines that the automatic driving start condition has been satisfied, the triggered engagement determination unit 14 determines whether the automatic driving start trigger has been input by the occupant. The automatic driving start trigger is input to the automatic driving system 100, when the occupant operates a trigger input unit included in an input unit of the HMI 6. For example, the automatic driving start trigger is input, when the occupant continues to press a button as the trigger input unit for a certain time. The automatic driving start trigger may be input by a voice. The triggered engagement determination unit 14 determines whether the automatic driving start trigger has been input, based on an input signal from the HMI 6.

The automatic engagement determination unit 15 determines whether an automatic engagement condition has been determined. The automatic engagement condition is a condition for starting the automatic driving control by the automatic engagement. As one automatic engagement condition, it is allowable to adopt a condition that the vehicle reaches a preset start point of the automatic engagement on the map. Examples of the start point of the automatic engagement include a point of an inlet of an automatic driving lane.

The automatic engagement condition may be the same as the above-described automatic driving start condition, or may be different from the automatic driving start condition. The automatic engagement condition may be a condition (strict condition) that makes the start of the automatic driving control harder compared to the automatic driving start condition.

As one automatic engagement condition, it is allowable to adopt a condition that the positional error of the vehicle by the vehicle position recognition unit 11 is equal to or less than a second error threshold. In this case, the second error threshold may be a smaller value than the error threshold in the automatic driving start condition. Similarly, as one automatic engagement condition, it is allowable to adopt a condition that the reliability of the automatic driving system 100, which is computed by a well-known technique, is equal to or more than a second reliability threshold. The second reliability threshold may be a larger value than the reliability threshold in the automatic driving start condition. As one automatic engagement condition, it is allowable to adopt a condition that the shift lever of the vehicle is at a shift position of "A (Automatic)".

The automatic engagement determination unit 15 does not determine the automatic engagement condition, when the automatic engagement is not permitted by the occupant. A state where the automatic engagement is permitted is referred to as an automatic engagement mode. For example, the automatic engagement mode may be established when the shift lever of the vehicle is switched to the shift position of "A (Automatic)". Even in the automatic engagement mode, the triggered engagement is enabled. Alternatively, in the automatic engagement mode, the triggered engagement may be disabled. In addition, as one automatic engagement condition, it is allowable to adopt a condition that the automatic engagement is permitted by the occupant.

The automatic engagement determination unit 15 determines whether the automatic engagement condition has been satisfied, based on the map information of the map database 4, the position of the vehicle on the map recognized by the vehicle position recognition unit 11, the traveling environment of the vehicle recognized by the traveling environment recognition unit 12, and the traveling state of the vehicle recognized by the traveling state recognition unit 13.

The traveling plan generation unit 16 generates the traveling plan for the automatic driving control, based on the map information of the map database 4, the route information of the navigation system 5, the position of the vehicle on the map recognized by the vehicle position recognition unit 11, the traveling environment of the vehicle recognized by the traveling environment recognition unit 12, and the traveling state of the vehicle recognized by the traveling state recognition unit 13.

The traveling plan includes a steering plan about the steering of the vehicle and a vehicle speed plan about the vehicle speed of the vehicle. The steering plan includes a target steering angle corresponding to a position on a route along which the vehicle travels by the automatic driving control. The position on the route is a position in the extending direction of the route (that is, a target route in the automatic driving control) on the map. Specifically, the position on the route may be a set lengthwise position that is set at a predetermined interval (for example, 1 m) in the extending direction of the route. The target steering angle is a value that is a control target of the steering angle of the vehicle in the traveling plan. The traveling plan generation unit 16 generates the steering plan by setting the target steering angle for each of positions away at a predetermined interval on the route. Here, a target steering torque or a target lateral position (the position in the width direction of a road that is a target of the vehicle) may be used instead of the target steering angle.

The vehicle speed plan includes a target vehicle speed corresponding to the position on the route along which the vehicle travels by the automatic driving control. The target vehicle speed is a value that is a control target of the vehicle speed of the vehicle in the traveling plan. The traveling plan generation unit 16 generates the vehicle speed plan by setting the target vehicle speed for each of position away at a predetermined interval on the route. Here, a target acceleration or a target jerk may be used, instead of the target vehicle speed. The reference may be time, instead of the position (set lengthwise position) on the route.

The traveling plan generation unit 16 generates a first traveling plan for the triggered engagement and a second traveling plan for the automatic engagement. The first traveling plan for the triggered engagement is a traveling plan in which a change in behavior of the vehicle at the time when the automatic driving control is started is sharpened compared to the second traveling plan for the automatic engagement. In other words, the second traveling plan for the automatic engagement is a traveling plan in which the change in the behavior of the vehicle at the time when the automatic driving control is started is moderated compared to the first traveling plan for the triggered engagement.

In the triggered engagement, the control of the vehicle is shifted to the automatic driving system 100 by the intention of the occupant, and it can be said that the occupant can predict the timing of the change of the behavior. Therefore, in the triggered engagement, it is possible that the vehicle is moved to the optimal route in the automatic driving control early in a range without impairing the ride quality for the occupant even when the behavior is sharply changed to some degree.

On the other hand, in the automatic engagement, the automatic driving control is not always started at a timing intended by the occupant. Therefore, when the behavior of the vehicle is greatly changed unexpectedly, an uneasy sense is given to the occupant. Further, in a time period shortly after the automatic driving control is started by the automatic engagement, the occupant determines whether to continue the automatic driving control. Therefore, it is desired to make a delay in which the driver who hopes to continue manual driving returns the driving mode to the manual driving before the behavior of the vehicle is greatly changed.

The first traveling plan for the trigged engagement includes a first steering plan and a first vehicle speed plan. The second traveling plan for the automatic engagement includes a second steering plan and a second vehicle speed plan. First, the difference between the first steering plan for the triggered engagement and the second steering plan for the automatic engagement will be described with use of FIG. 2A and FIG. 2B.

Figure 2A:
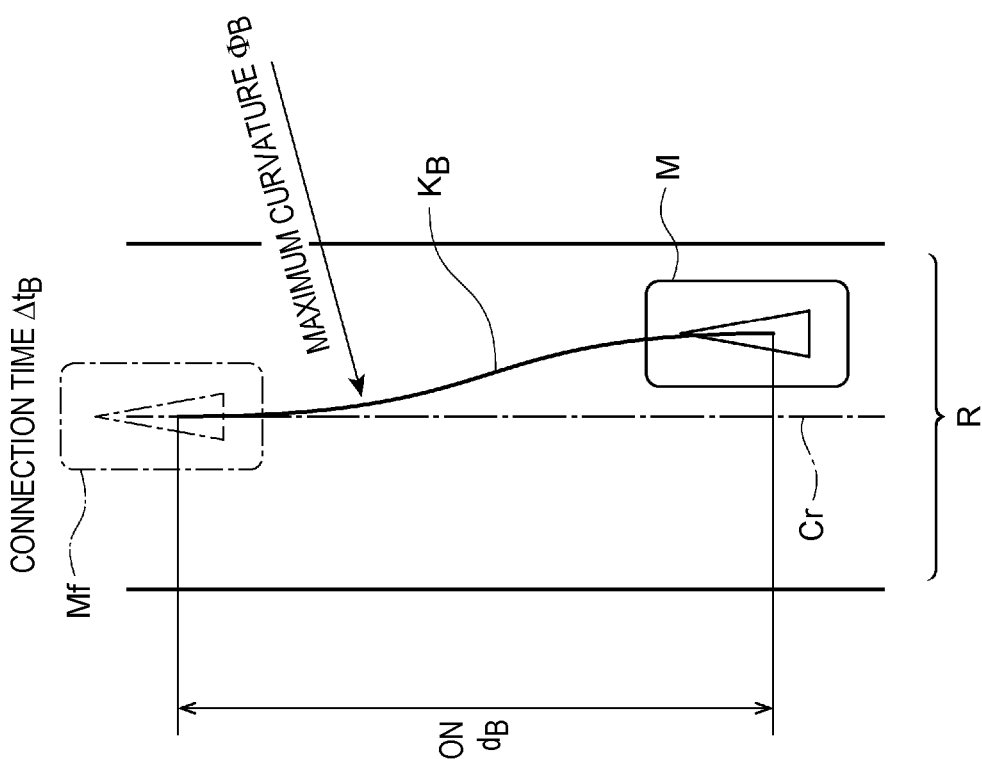
FIG. 2A is a plan view for describing a first steering plan for a triggered engagement.

FIG. 2A is a plan view for describing the first steering plan for the triggered engagement. FIG. 2A shows a vehicle M. a lane R on which the vehicle M travels, an optimal route Cr in the automatic driving control, a future position Mf of the vehicle M that is connected to the optimal route Cr, and a course $K_A$ along which the vehicle M connects to the optimal route Cr by the triggered engagement. In FIG. 2A, the course $K_A$ is a course of the vehicle M that is scheduled in the first steering plan for the triggered engagement.

Further, FIG. 2A shows a connection distance $d_A$ of the course $K_A$, a maximum curvature $\Phi_A$ of the course $K_A$, and a connection time $\Delta t_A$ of the course $K_A$. The connection distance $d_A$ of the course $K_A$ is a distance of the course $K_A$ in the extending direction of the lane R (a distance by which the vehicle M travels in the extending direction of the lane R until the vehicle M connects to the optimal route Cr). The maximum curvature $\Phi_A$ of the course $K_A$ is the greatest curvature on the course $K_A$. The connection time $\Delta t_A$ of the course $K_A$ is a time required before the vehicle M connects to the optimal route Cr when the vehicle M travels along the course $K_A$.

Figure 2B:
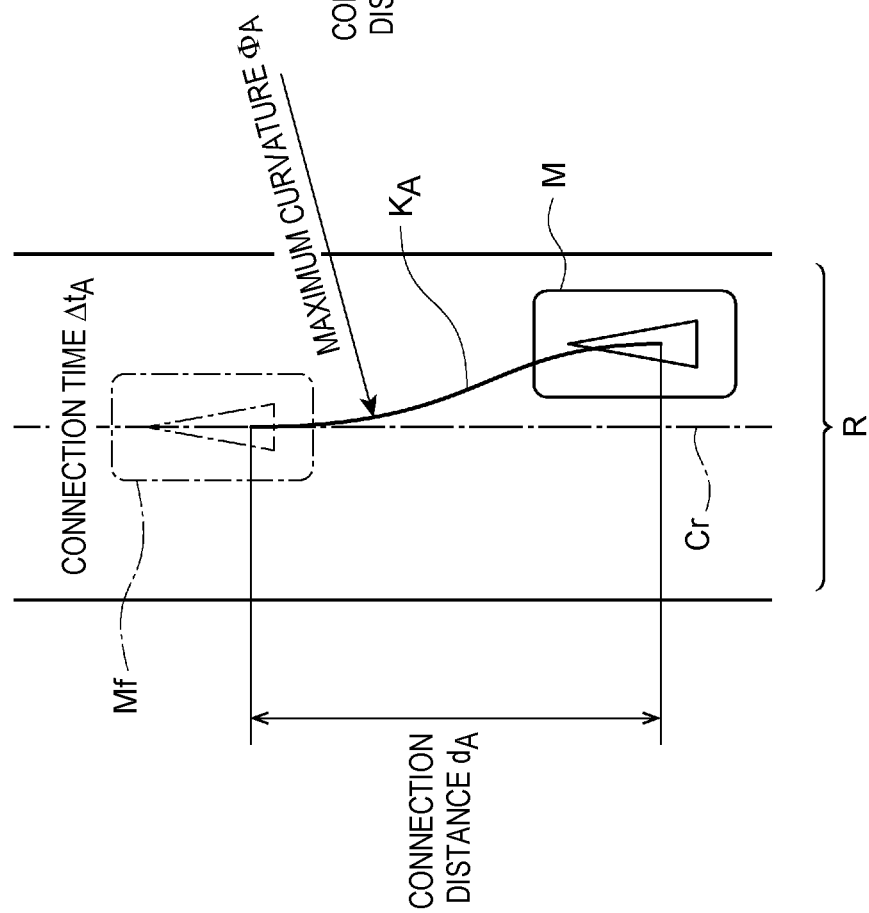
FIG. 2B is a plan view for describing a second steering plan for an automatic engagement.

FIG. 2B is a plan view for describing the second steering plan for the automatic engagement. FIG. 2B shows a course $K_B$ along which the vehicle M connects to the optimal route Cr by the automatic engagement, a connection distance $d_B$ of the course $K_B$, a maximum curvature $\Phi_B$ of the course $K_B$, and a connection time $\Delta t_B$ of the course $K_B$.

As shown in FIG. 2A and FIG. 2B, the course $K_B$ for the automatic engagement is gentler than the course $K_A$ for the triggered engagement. Specifically, the connection distance $d_B$ of the course $K_B$ is longer than the connection distance $d_A$ of the course $K_A$. Further, the maximum curvature $\Phi_B$ of the course $K_B$ is smaller than the maximum curvature $\Phi_A$ of the course $K_A$. The connection time $\Delta t_B$ of the course $K_B$ is shorter than the connection time $\Delta t_A$ of the course $K_A$. Here, to facilitate understanding, it is assumed that the connection time is a connection time when the vehicle M travels at a constant vehicle speed.

In this way, the course $K_B$ in the second steering plan for the automatic engagement is generated so as to become a gentler course than the course $K_A$ in the first steering plan for the triggered engagement. The gentler course means that the change in the steering of the vehicle M (the temporal change in steering angle or temporal change in steering torque) is moderated.

All of the connection distance $d_B$, maximum curvature $\Phi_B$ and connection time $\Delta t_B$ of the course $K_B$ do not need to be smaller than the connection distance $d_A$, maximum curvature $\Phi_A$ and connection time $\Delta t_A$ of the course $K_A$. At least one of the connection distance $d_B$, maximum curvature $\Phi_B$ and connection time $\Delta t_B$ of the course $K_B$ only needs to be smaller than the corresponding one of the connection distance $d_A$, maximum curvature $\Phi_A$ and connection time $\Delta t_A$ of the course $K_A$.

Figure 3:
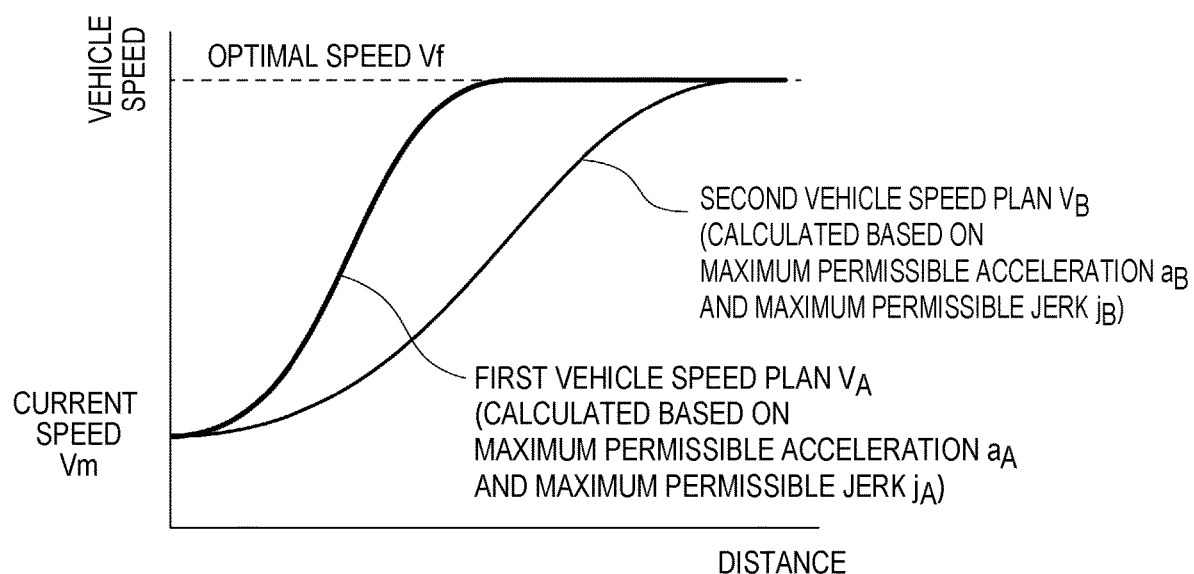
FIG. 3 is a graph for describing a first vehicle speed plan for the triggered engagement and a second vehicle speed plan for the automatic engagement.

Next, the difference between the first vehicle speed plan for the triggered engagement and the second vehicle speed plan for the automatic engagement will be described with use of FIG. 3. FIG. 3 is a graph for describing the first vehicle speed plan for the triggered engagement and the second vehicle speed plan for the automatic engagement. The ordinate of the graph of FIG. 3 indicates vehicle speed, and the abscissa indicates distance (distance on the course $K_A$ or the course $K_B$). FIG. 3 shows a current speed Vm of the vehicle M, an optimal vehicle speed Vf in the automatic driving control, a first vehicle speed plan $V_A$, and a second vehicle speed plan $V_B$.

As shown in FIG. 3, the second vehicle speed plan $V_B$ for the automatic engagement is generated such that the change in the vehicle speed of the vehicle M is moderated compared to the first vehicle speed plan $V_A$ for the triggered engagement. Specifically, the first vehicle speed plan $V_A$ is generated such that a maximum permissible acceleration $a_A$ and a maximum permissible jerk $j_A$ are satisfied. The maximum permissible acceleration $a_A$ is the greatest acceleration that is permitted in the first vehicle speed plan $V_A$. The maximum permissible jerk $j_A$ is the greatest jerk that is permitted in the first vehicle speed plan $V_A$. The second vehicle speed plan $V_B$ is generated such that a maximum permissible acceleration $a_B$ and a maximum permissible jerk $j_B$ are satisfied. On this occasion, the maximum permissible acceleration $a_B$ is a smaller value than the maximum permissible acceleration $a_A$. The maximum permissible jerk $j_B$ is a smaller value than the maximum permissible jerk $j_A$.

Similarly to the maximum permissible acceleration, a maximum permissible deceleration may be specified. Further, it is not always necessary to use both of the maximum permissible acceleration and the maximum permissible jerk. In the second vehicle speed plan $V_B$, the maximum permissible acceleration $a_B$ only needs to be smaller than the maximum permissible acceleration $a_A$, or the maximum permissible jerk $j_B$ only needs to be smaller than the maximum permissible jerk $j_A$.

In this way, the second vehicle speed plan $V_B$ for the automatic engagement is generated such that the change in the vehicle speed at the time when the automatic driving control is started is moderated compared to the first vehicle speed plan $V_A$ for the triggered engagement. Thereby, the second traveling plan for the automatic engagement is generated such that the change in the behavior of the vehicle at the time when the automatic driving control is started is moderated compared to the first traveling plan for the triggered engagement.

In the second traveling plan for the automatic engagement, both of the second steering plan and the second vehicle speed plan do not need to be moderated compared to the first steering plan and the first vehicle speed plan. In the second traveling plan for the automatic engagement, the second steering plan only needs to be moderated in the change in the steering of the vehicle M, compared to the first steering plan, or the second vehicle speed plan only needs to be moderated in the change in the vehicle speed of the vehicle M, compared to the first vehicle speed plan.

The traveling plan generation unit 16 generates the first traveling plan and the second traveling plan in the background, during the traveling of the vehicle. That is, the traveling plan generation unit 16 previously generates the first traveling plan before the triggered engagement determination unit 14 determines that the automatic driving start trigger has been input. The traveling plan generation unit 16 previously generates the second traveling plan before the automatic engagement determination unit 15 determines that the automatic engagement condition has been satisfied. The traveling plan generation unit 16 can generate the first traveling plan and the second traveling plan in parallel.

The vehicle control unit 17 executes the automatic driving control of the vehicle M, based on the map information of the map database 4, the position of the vehicle on the map of the vehicle position recognition unit 11, the traveling environment of the vehicle of the traveling environment recognition unit 12, the traveling state of the traveling state recognition unit 13, and the first traveling plan or second traveling plan generated by the traveling plan generation unit 16. The vehicle control unit 17 executes the automatic driving control of the vehicle M, by sending a control signal to the actuator 7.

When the triggered engagement determination unit 14 determines that the automatic driving start condition has been satisfied and the automatic driving start trigger has been input by the occupant, the vehicle control unit 17 starts the automatic driving control of the vehicle M by the triggered engagement, in accordance with the first traveling plan for the triggered engagement.

When the automatic engagement determination unit 15 determines that the automatic engagement condition has been satisfied, the vehicle control unit 17 starts the automatic driving control of the vehicle M by the automatic engagement, in accordance with the second traveling plan for the automatic engagement.

Processes by Automatic Driving System According to First Embodiment

Next, processes by the automatic driving system 100 according to the first embodiment will be described with reference to the drawings.

[Traveling Plan Generation Process]

FIG. 4 is a flowchart showing a traveling plan generation process. The flowchart shown in FIG. 4 is executed when an ignition of the vehicle M is in an ON state.

As shown in FIG. 4, in S10, the ECU 10 of the automatic driving system 100 generates the first traveling plan for the triggered engagement and the second traveling plan for the automatic engagement, with the traveling plan generation unit 16. The traveling plan generation unit 16 generates the first traveling plan and the second traveling plan, based on the map information of the map database 4, the route information of the navigation system 5, the position of the vehicle on the map recognized by the vehicle position recognition unit 11, the traveling environment of the vehicle recognized by the traveling environment recognition unit 12, and the traveling state of the vehicle recognized by the traveling state recognition unit 13. The traveling plan generation unit 16 generates the second traveling plan for the automatic engagement so as to moderate the change in the behavior of the vehicle at the time when the automatic driving control is started compared to the first traveling plan for the triggered engagement.

Thereafter, the ECU 10 ends this process. The ECU 10 starts the process in S10 again, for example, after the elapse of a certain time.

Start Process for Automatic Driving Control by Triggered Engagement

FIG. 5A is a flowchart showing a start process for the automatic driving control by the triggered engagement. The process of the flowchart in FIG. 5A is executed when the ignition of the vehicle M is in the ON state and the automatic driving control is not being executed. The input of the automatic driving start trigger by the occupant may be adopted as an execution condition of the flowchart in FIG. 5A.

As shown in FIG. 5A, in S20, the ECU 10 of the automatic driving system 100 determines whether the automatic driving start condition has been satisfied and the automatic driving start trigger has been input by the occupant, with the triggered engagement determination unit 14. The triggered engagement determination unit 14 determines whether the automatic driving start condition has been satisfied, based on the map information of the map database 4, the position of the vehicle on the map recognized by the vehicle position recognition unit 11, the traveling environment of the vehicle recognized by the traveling environment recognition unit 12, and the traveling state of the vehicle recognized by the traveling state recognition unit 13. The triggered engagement determination unit 14 determines whether the automatic driving start trigger has been input, based on the input signal from the HMI 6.

When the ECU 10 determines that the automatic driving start condition has been satisfied and the automatic driving start trigger has been input by the occupant (S20: YES), the ECU 10 transitions to S22. When the ECU 10 does not determine that the automatic driving start condition has been satisfied and the automatic driving start trigger has been input by the occupant (S20: NO), the ECU 10 ends this process. Thereafter, the ECU 10 repeats the process from S20.

In S22, the ECU 10 starts the automatic driving control of the vehicle M by the triggered engagement, with the vehicle control unit 17. The vehicle control unit 17 starts the automatic driving control of the vehicle M by the triggered engagement, in accordance with the first traveling plan for the triggered engagement. Thereafter, the ECU 10 ends this process.

[Start Process for Automatic Driving Control by Automatic Engagement]

FIG. 5B is a flowchart showing a start process for the automatic driving control by the automatic engagement. The process of the flowchart in FIG. 5B is executed when the ignition of the vehicle M is in the ON state, the automatic driving control is not being executed and the automatic engagement is permitted.

As shown in FIG. 5B, in S30, the ECU 10 of the automatic driving system 100 determines whether the automatic engagement condition has been satisfied, with the automatic engagement determination unit 15. The automatic engagement determination unit 15 determines whether the automatic engagement condition has been satisfied, based on the map information of the map database 4, the position of the vehicle on the map recognized by the vehicle position recognition unit 11, the traveling environment of the vehicle recognized by the traveling environment recognition unit 12, and the traveling state of the vehicle recognized by the traveling state recognition unit 13.

When the ECU 10 determines that the automatic engagement condition has been satisfied (S30: YES), the ECU 10 transitions to S32. When the ECU 10 does not determine that the automatic engagement condition has been satisfied (S30: NO), the ECU 10 ends this process. Thereafter, the ECU 10 repeats the process from S30, when the automatic driving control is not being executed and the automatic engagement is permitted.

In S32, the ECU 10 starts the automatic driving control of the vehicle M by the automatic engagement, with the vehicle control unit 17. The vehicle control unit 17 starts the automatic driving control of the vehicle M by the automatic engagement, in accordance with the second traveling plan for the automatic engagement. Thereafter, the ECU 10 ends this process.

Function Effect of Automatic Driving System According to First Embodiment

The automatic driving system 100 according to the first embodiment described above generates the traveling plan so as to moderate the change in the behavior of the vehicle M at the time when the automatic driving control is started by the automatic engagement compared to the change in the behavior of the vehicle M at the time when the automatic driving control is started by the triggered engagement. Therefore, it is possible to restrain an uneasy sense from being given to the occupant at the time when the automatic driving control is started by the automatic engagement, compared to when the change in the behavior of the vehicle M at the time of the start of the automatic driving control is the same between the triggered engagement and the automatic engagement. Further, in the automatic driving system 100, by moderating the change in the behavior of the vehicle M at the time when the automatic driving control is started by the automatic engagement, it is possible to secure a delay for cancelling the automatic driving control before the behavior of the vehicle M is greatly changed in the case where the driver hopes to continue the manual driving.

Furthermore, in the automatic driving system 100, the traveling plan generation unit 16 generates the first traveling plan for the triggered engagement and the second traveling plan for the automatic engagement. Therefore, even when the occupant suddenly inputs the automatic driving start trigger during the preparation of the automatic engagement, it is possible to start the automatic driving control by the triggered engagement, based on the first traveling plan.

Modification of First Embodiment

In the following, a modification of the first embodiment will be described. The modification is different from the first embodiment, in that the traveling plan generation unit 16 generates only one traveling plan at the time when the automatic driving control is started.

Specifically, when the triggered engagement determination unit 14 determines that the automatic driving start condition has been satisfied and the automatic driving start trigger has been input by the occupant, the traveling plan generation unit 16 generates the traveling plan by a first generation method for the triggered engagement. The first generation method is a method of generating a traveling plan in which the change in the behavior of the vehicle M at the time when the automatic driving control is started is sharpened compared to a second generation method described later.

When the automatic engagement determination unit 15 determines that the automatic engagement condition has been satisfied, the traveling plan generation unit 16 generates the traveling plan by the second generation method for the automatic engagement. The second generation method is a method of generating a traveling plan in which the change in the behavior of the vehicle M at the time when the automatic driving control is started is moderated compared to the first generation method.

The first generation method and the second generation method are different from each other, for example, in the setting of various parameters. The various parameters include the connection distance, maximum curvature and connection time in the steering plan, and the maximum permissible acceleration and maximum permissible jerk in the vehicle speed plan.

Specifically, in the first generation method, the steering plan of the traveling plan is generated using the above-described connection distance $d_A$, maximum curvature $\Phi_A$ and connection time $\Delta t_A$. In the second method, the steering plan of the traveling plan is generated using the above-described connection distance $d_B$, maximum curvature $\Phi_B$ and connection time $\Delta t_B$. In the first generation method, the vehicle speed plan of the traveling plan is generated using the above-described maximum permissible acceleration $a_A$ and maximum permissible jerk $j_A$. In the second generation method, the vehicle speed plan of the traveling plan is generated using the above-described maximum permissible acceleration $a_B$ and maximum permissible jerk $j_B$.

It is not necessary to use all of the above-described various parameters. At least one of the various parameters only needs to be appropriately selected, so that the second generation method makes it possible to generate a traveling plan in which the change in the behavior of the vehicle M at the time when the automatic driving control is started is moderated compared to the first generation method. The switching between the first generation method and the second generation method may be performed gradually and moderately, instead of a simple parameter switching (connection distance $d_A$→connection distance $d_B$).

[Modification of Start Process for Automatic Driving Control by Triggered Engagement]

Figure 6A:
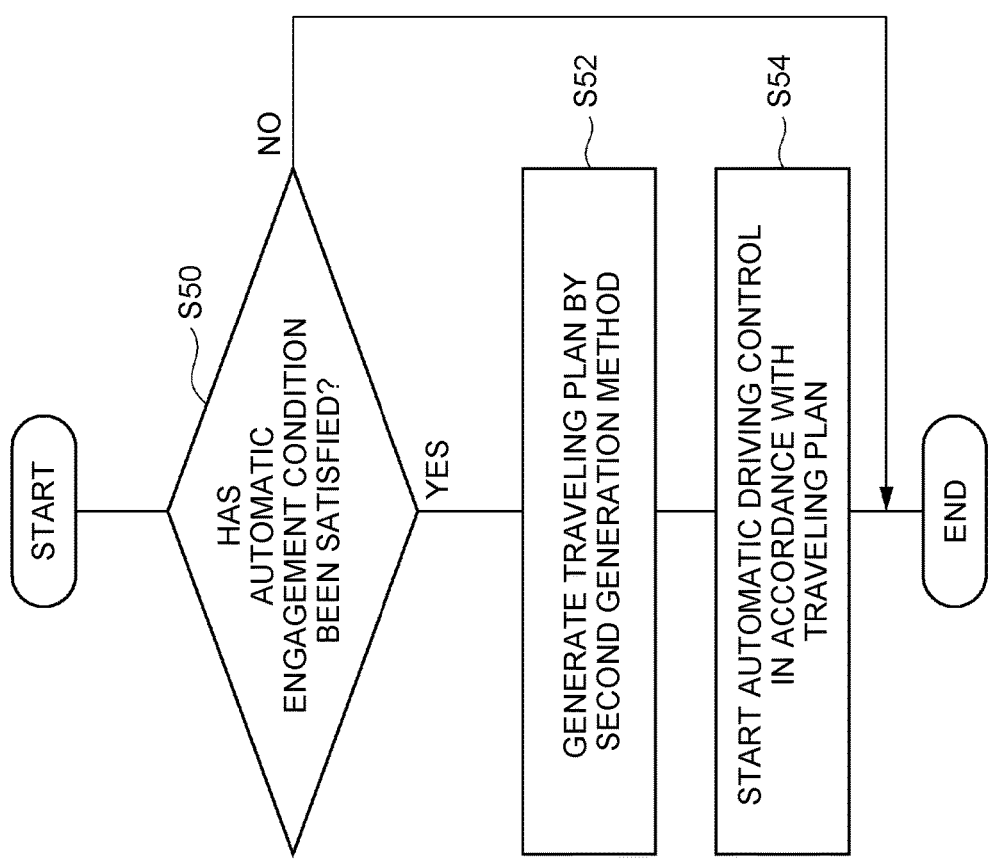
FIG. 6A is a flowchart showing a modification of the start process for the automatic driving control by the triggered engagement.

FIG. 6A is a flowchart showing a modification of the start process for the automatic driving control by the triggered engagement. The process of the flowchart in FIG. 6A is executed when the ignition of the vehicle M is in the ON state and the automatic driving control is not being executed. The input of the automatic driving start trigger by the occupant may be adopted as an execution condition of the flowchart in FIG. 6A.

As shown in FIG. 6A, in S40, the ECU 10 of the automatic driving system 100 determines whether the automatic driving start condition has been satisfied and the automatic driving start trigger has been input by the occupant, with the triggered engagement determination unit 14. When the ECU 10 determines that the automatic driving start condition has been satisfied and the automatic driving start trigger has been input by the occupant (S40: YES), the ECU 10 transitions to S42. When the ECU 10 does not determine that the automatic driving start condition has been satisfied and the automatic driving start trigger has been input by the occupant (S40: NO), the ECU 10 ends this process. Thereafter, the ECU 10 repeats the process from S40.

In S42, the ECU 10 generates the traveling plan by the first generation method, with the traveling plan generation unit 16. The traveling plan generation unit 16 generates the traveling plan by the first generation method for the triggered engagement, based on the map information of the map database 4, the route information of the navigation system 5, the position of the vehicle on the map recognized by the vehicle position recognition unit 11, the traveling environment of the vehicle recognized by the traveling environment recognition unit 12, and the traveling state of the vehicle recognized by the traveling state recognition unit 13. Thereafter, the ECU 10 transitions to S44.

In S44, the ECU 10 starts the automatic driving control of the vehicle M by the triggered engagement, with the vehicle control unit 17. The vehicle control unit 17 starts the automatic driving control of the vehicle M by the triggered engagement, in accordance with the traveling plan generated by the first generation method for the triggered engagement. Thereafter, the ECU 10 ends this process.

[Modification of Start Process for Automatic Driving Control by Automatic Engagement]

Figure 6B:
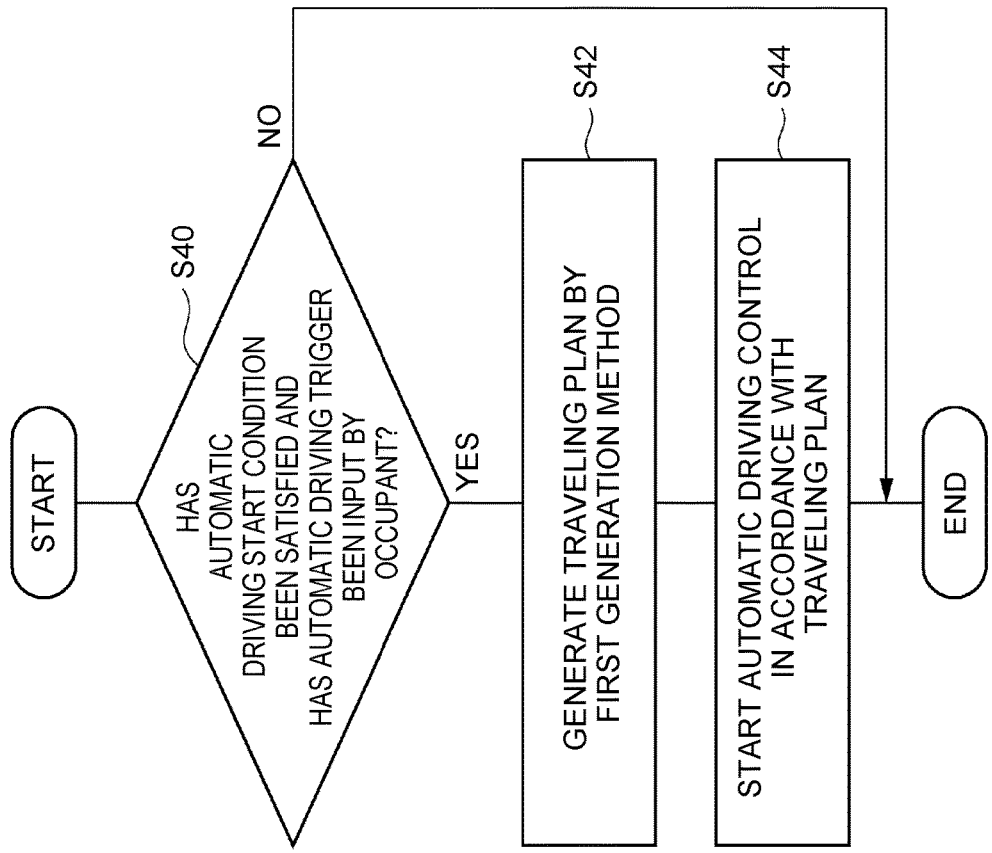
FIG. 6B is a flowchart showing a modification of the start process for the automatic driving control by the automatic engagement.

FIG. 6B is a flowchart showing a modification of the start process for the automatic driving control by the automatic engagement. The process of the flowchart in FIG. 6B is executed when the ignition of the vehicle M is in the ON state, the automatic driving control is not being executed and the automatic engagement is permitted.

As shown in FIG. 6B, in S50, the ECU 10 of the automatic driving system 100 determines whether the automatic engagement condition has been satisfied, with the automatic engagement determination unit 15. When the ECU 10 determines that the automatic engagement condition has been satisfied (S50: YES), the ECU 10 transitions to S52. When the ECU 10 does not determine that the automatic engagement condition has been satisfied (S50: NO), the ECU 10 ends this process. Thereafter, the ECU 10 repeats the process from S50, when the automatic driving control is not being executed and the automatic engagement is permitted.

In S52, the ECU 10 generates the traveling plan by the second generation method, with the traveling plan generation unit 16. The traveling plan generation unit 16 generates the traveling plan by the second generation method for the automatic engagement, based on the map information of the map database 4, the route information of the navigation system 5, the position of the vehicle on the map recognized by the vehicle position recognition unit 11, the traveling environment of the vehicle recognized by the traveling environment recognition unit 12, and the traveling state of the vehicle recognized by the traveling state recognition unit 13. Thereafter, the ECU 10 transitions to S54.

In S54, the ECU 10 starts the automatic driving control of the vehicle M by the automatic engagement, with the vehicle control unit 17. The vehicle control unit 17 starts the automatic driving control of the vehicle M by the automatic engagement, in accordance with the traveling plan generated by the second generation method for the automatic engagement. Thereafter, the ECU 10 ends this process.

In the automatic driving system 100 according to the modification described above, the traveling plan is generated when the automatic driving control is started by the triggered engagement or the automatic engagement. Therefore, it is possible to decrease computation load in the whole system, compared to when both the traveling plan for the triggered engagement and the traveling plan for the automatic engagement are generated.

Second Embodiment

Figure 7:
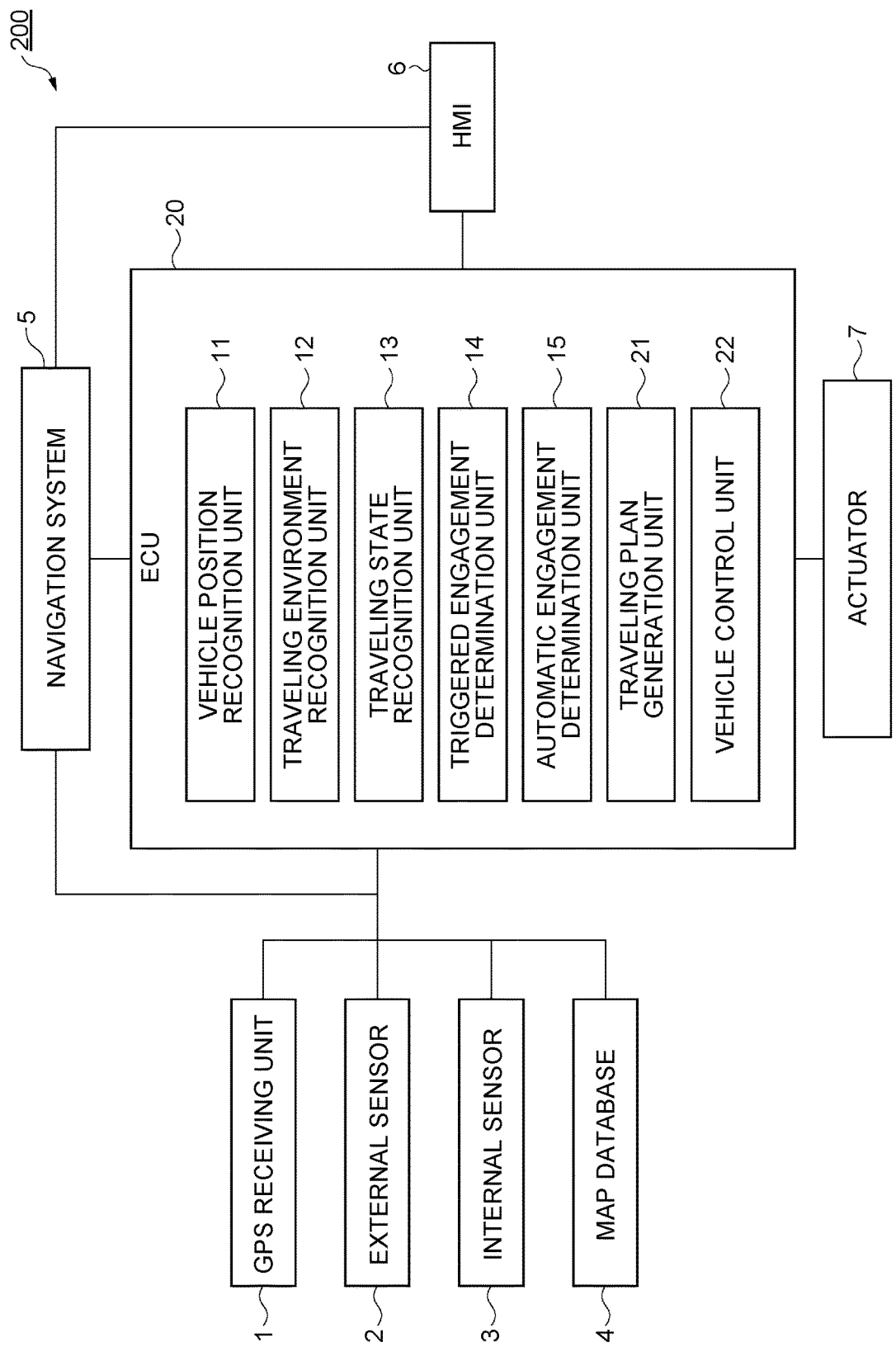
FIG. 7 is a block diagram showing an automatic driving system according to a second embodiment.

FIG. 7 is a block diagram showing an automatic driving system according to a second embodiment. An automatic driving system 200 according to the second embodiment is different from the automatic driving system 100 according to the first embodiment, in that the automatic driving system 200 moderates the change in the behavior of the vehicle at the time when the automatic driving control is started by the automatic engagement compared to the change in the behavior of the vehicle at the time when the automatic driving control is started by the triggered engagement, by changing a control gain for vehicle control instead of the traveling plan.

Configuration of Automatic Driving System According to Second Embodiment

The automatic driving system 200 according to the second embodiment shown in FIG. 7 is different from the first embodiment in that the automatic driving system 200 includes the traveling plan generation unit 21 and vehicle control unit 22, instead of the traveling plan generation unit 16 and the vehicle control unit 17. The functions of the traveling plan generation unit 21 and the vehicle control unit 22 in ECU 20 are partly different from the traveling plan generation unit 16 and the vehicle control unit 17 in ECU 10, respectively.

The traveling plan generation unit 21 generates the traveling plan with no distinction between the triggered engagement and the automatic engagement. The traveling plan generation unit 21 generates the traveling plan by a well-known technique, based on the map information of the map database 4, the route information of the navigation system 5, the position of the vehicle on the map recognized by the vehicle position recognition unit 11, the traveling environment of the vehicle recognized by the traveling environment recognition unit 12, and the traveling state of the vehicle recognized by the traveling state recognition unit 13.

The vehicle control unit 22 executes the automatic driving control of the vehicle M, in accordance with the traveling plan generated by the traveling plan generation unit 21. When the triggered engagement determination unit 14 determines that the automatic driving start condition has been satisfied and the automatic driving start trigger has been input by the occupant, the vehicle control unit 22 starts the automatic driving control of the vehicle M by the triggered engagement, using a first control gain for the triggered engagement. The first control gain for the triggered engagement is set to a larger value than a second control gain for the automatic engagement described later.

When the automatic engagement determination unit 15 determines that the automatic engagement condition has been satisfied, the vehicle control unit 22 starts the automatic driving control of the vehicle M by the automatic engagement, using the second control gain for the automatic engagement. The second control gain for the automatic engagement is set to a smaller value than the first control gain for the triggered engagement. That is, the second control gain for the automatic engagement is set so as to be lower than the first control gain for the triggered engagement, in the followability to the target steering angle or target vehicle speed in the traveling plan.

Thereby, the vehicle control unit 22 can moderate the change in the behavior of the vehicle M at the time when the automatic driving control is started by the automatic engagement, compared to the change in the behavior of the vehicle M at the time when the automatic driving control is started by the triggered engagement. The first control gain and the second control gain only need to be different from each other in at least one of the steering and the vehicle speed. The switching between the first control gain and the second control gain may be performed gradually and moderately, instead of a simple switching between two values.

Figure 8A:
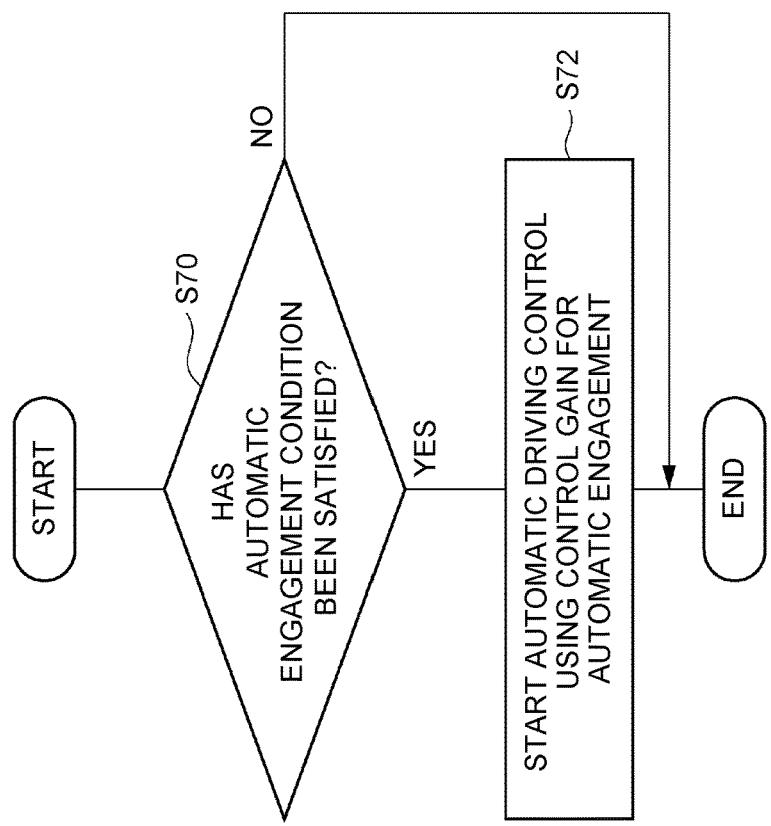
FIG. 8A is a flowchart showing a start process for the automatic driving control by the triggered engagement in the second embodiment.

Start Process for Automatic Driving Control by Triggered Engagement in Second Embodiment FIG. 8A is a flowchart showing a start process for the automatic driving control by the triggered engagement in the second embodiment. The process of the flowchart in FIG. 8A is executed when the ignition of the vehicle M is in the ON state and the automatic driving control is not being executed. The input of the automatic driving start trigger by the occupant may be adopted as an execution condition of the flowchart in FIG. 8A.

As shown in FIG. 8A, in S60, the ECU 20 of the automatic driving system 200 determines whether the automatic driving start condition has been satisfied and the automatic driving start trigger has been input by the occupant, with the triggered engagement determination unit 14. When the ECU 20 determines that the automatic driving start condition has been satisfied and the automatic driving start trigger has been input by the occupant (S60: YES), the ECU 20 transitions to S62. When the ECU 20 does not determine that the automatic driving start condition has been satisfied and the automatic driving start trigger has been input by the occupant (S60: NO), the ECU 20 ends this process. Thereafter, the ECU 20 repeats the process from S60.

In S62, the ECU 20 starts the automatic driving control of the vehicle M by the triggered engagement, with the vehicle control unit 22. The vehicle control unit 22 starts the automatic driving control of the vehicle M by the triggered engagement, using the first control gain for the triggered engagement. Thereafter, the ECU 20 ends this process.

[Start Process for Automatic Driving Control by Automatic Engagement]

Figure 8B:
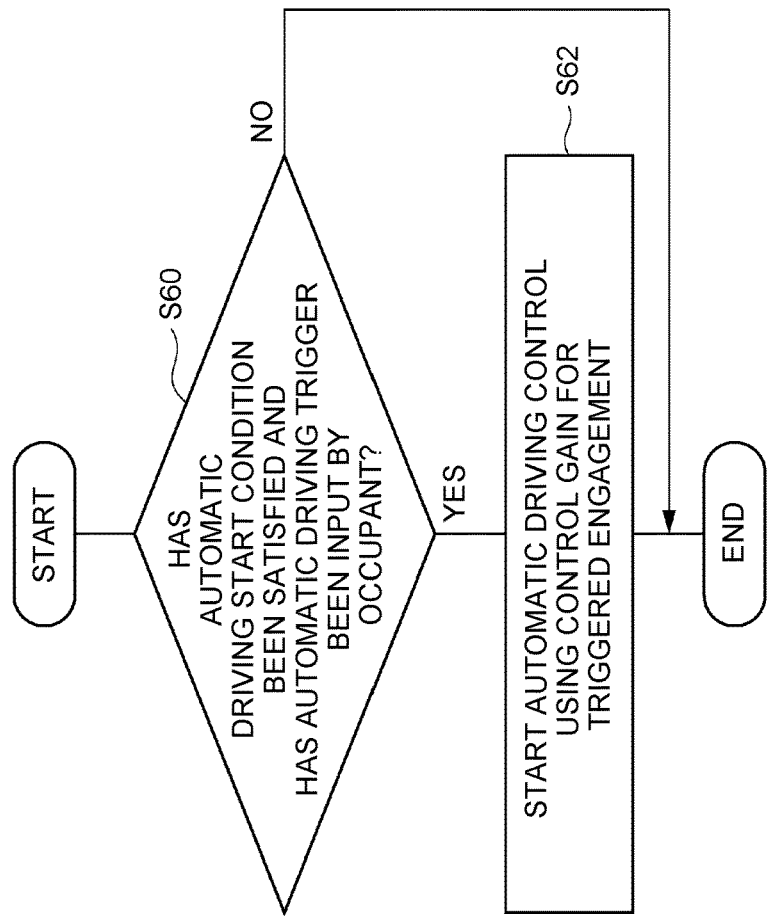
FIG. 8B is a flowchart showing a start process for the automatic driving control by the automatic engagement in the second embodiment.

FIG. 8B is a flowchart showing a start process for the automatic driving control by the automatic engagement. The process of the flowchart in FIG. 8B is executed when the ignition of the vehicle M is in the ON state, the automatic driving control is not being executed and the automatic engagement is permitted.

As shown in FIG. 8B, in S70, the ECU 20 of the automatic driving system 200 determines whether the automatic engagement condition has been satisfied, with the automatic engagement determination unit 15. When the ECU 20 determines that the automatic engagement condition has been satisfied (S70: YES), the ECU 20 transitions to S72. When the ECU 20 does not determine that the automatic engagement condition has been satisfied (S70: NO), the ECU 20 ends this process. Thereafter, the ECU 20 repeats the process from S70, when the automatic driving control is not being executed and the automatic engagement is permitted.

In S72, the ECU 20 starts the automatic driving control of the vehicle M by the automatic engagement, with the vehicle control unit 22. The vehicle control unit 22 starts the automatic driving control of the vehicle M by the automatic engagement, using the second control gain for the automatic engagement. Thereafter, the ECU 20 ends this process.

Function Effect of Automatic Driving System According to Second Embodiment

The automatic driving system 200 according to the second embodiment describe above controls the vehicle M so as to moderate the change in the behavior of the vehicle M at the time when the automatic driving control is started by the automatic engagement compared to the change in the behavior of the vehicle M at the time when the automatic driving control is started by the triggered engagement. Therefore, it is possible to restrain an uneasy sense from being given to the occupant at the time when the automatic driving control is started by the automatic engagement, compared to when the change in the behavior of the vehicle M at the time of the start of the automatic driving control is the same between the triggered engagement and the automatic engagement.

Thus, preferred embodiments have been described, but the disclosure is not limited to the above-described embodiments. In addition to the above-described embodiments, the disclosure can be carried out as a variety of modes in which various modifications and improvements are made based on the knowledge of a person skilled in the art.

In the description of the steering plan in FIG. 2A and FIG. 2B, it is assumed that the optimal route Cr on the lane R is set regardless of the current position of the vehicle M. However, an optimal route (course) in which the starting point is the current position of the vehicle M may be generated. The various parameters described in the first embodiment and the modification may include the lateral acceleration of the vehicle M, the steering angle velocity/ acceleration of the vehicle M, and the like.

The automatic driving system 100 according to the first embodiment or modification may employ the switching between the first control gain and second control gain in the second embodiment. In this case, with both of the traveling plan and the vehicle control, the automatic driving system 100 can moderate the change in the behavior of the vehicle at the time when the automatic driving control is started by the automatic engagement, compared to the change in the behavior of the vehicle at the time when the automatic driving control is started by the triggered engagement.

What is claimed is:

1. An automatic driving system comprising at least one electronic control unit configured to: generate a traveling plan of a vehicle, and execute automatic driving control of the vehicle by controlling behavior of the vehicle in accordance with the traveling plan, using an actuator equipped in the vehicle, wherein the traveling plan governs the behavior of the vehicle such that changes in the behavior of the vehicle are moderated more when the automatic driving control of the vehicle is started by an automatic engagement compared to when the automatic driving control is started by a triggered engagement, the automatic engagement being an engagement in which the automatic driving control is automatically started when an automatic engagement condition is satisfied, the triggered engagement being an engagement in which the automatic driving control is started when an automatic driving start condition is satisfied and an automatic driving start trigger is input by an occupant, and wherein the at least one electric control unit is configured to generate the traveling plan so as to moderate the changes in the behavior of the vehicle at the time when the automatic driving control is started by the automatic engagement compared to the changes in the behavior of the vehicle at the time when the automatic driving control is started by the triggered engagement, by at least one of decreasing a change in a vehicle speed at which the vehicle travels until the vehicle reaches a predetermined position from a current position of the vehicle, increasing a distance by which the vehicle travels until the vehicle reaches the predetermined position from the current position of the vehicle, increasing a time that elapses until the vehicle reaches the predetermined position from the current position of the vehicle, and decreasing a maximum curvature of a route along which the vehicle travels until the vehicle reaches the predetermined position from the current position of the vehicle.

2. The automatic driving system according to claim 1, wherein
the at least one electronic control unit is configured to
generate a first traveling plan as the traveling plan, the first traveling plan being used in the automatic driving control by the triggered engagement,
generate a second traveling plan, as the traveling plan, the second traveling plan being used in the automatic driving control by the automatic engagement,
control the behavior of the vehicle based on the first traveling plan, in the automatic driving control by the triggered engagement, and
control the behavior of the vehicle based on the second traveling plan, in the automatic driving control by the automatic engagement.

3. The automatic driving system according to claim 1, wherein
the at least one electronic control unit is configured to
generate the traveling plan by a first generation method corresponding to the triggered engagement, when the automatic driving start condition is satisfied and the automatic driving start trigger is input by the occupant, and
generate the traveling plan by a second generation method corresponding to the automatic engagement, when the automatic engagement condition is satisfied.

4. The automatic driving system according to claim 1, wherein
the at least one electronic control unit is configured to control the vehicle so as to moderate the changes in the behavior of the vehicle at the time when the automatic driving control is started by the automatic engagement compared to the changes in the behavior of the vehicle at the time when the automatic driving control is started by the triggered engagement.

5. An automatic driving system comprising at least one electronic control unit configured to: generate a traveling plan in an automatic driving control of a vehicle; execute the automatic driving control by controlling behavior of the vehicle based on the traveling plan, using an actuator equipped in the vehicle; and govern the behavior of the vehicle such that changes in the behavior of the vehicle are moderated more when the automatic driving control is started by an automatic engagement compared to when the automatic driving control is started by a triggered engagement, the automatic engagement being an engagement in which the automatic driving control is automatically started when an automatic engagement condition is satisfied, the triggered engagement being an engagement in which the automatic driving control is started when an automatic driving start condition is satisfied and an automatic driving start trigger is input by an occupant, wherein the at least one electric control unit is configured to generate the traveling plan so as to moderate changes in the behavior of the vehicle at a time when the automatic driving control is started by the automatic engagement compared to changes in the behavior of the vehicle at the time when the automatic driving control is started by the triggered engagement, by at least one of decreasing a change in a vehicle speed at which the vehicle travels until the vehicle reaches a predetermined position from a current position of the vehicle, increasing a distance by which the vehicle travels until the vehicle reaches the predetermined position from the current position of the vehicle, increasing a time that elapses until the vehicle reaches the predetermined position from the current position of the vehicle, and decreasing a maximum curvature of a route along which the vehicle travels until the vehicle reaches the predetermined position from the current position of the vehicle.

6. The automatic driving system according to claim 5, wherein
    the at least one electronic control unit is configured to moderate the changes in the behavior of the vehicle at the time when the automatic driving control is started by the automatic engagement compared to the changes in the behavior of the vehicle at the time when the automatic driving control is started by the triggered engagement, by decreasing a followability to the traveling plan for the vehicle.

\* \* \* \* \*